US009492824B2

(12) United States Patent
Jacobs et al.

(10) Patent No.: US 9,492,824 B2
(45) Date of Patent: Nov. 15, 2016

(54) EFFICIENT DILUTION METHOD, INCLUDING WASHING METHOD FOR IMMUNOASSAY

(71) Applicant: SHARP KABUSHIKI KAISHA, Osaka (JP)

(72) Inventors: Adrian Marc Simon Jacobs, Reading (GB); Jason Roderick Hector, Oxford (GB); Hywel Morgan, Hants (GB)

(73) Assignee: Sharp Kabushiki Kaisha, Osaka (JP)

( * ) Notice: Subject to any disclaimer, the term of this patent is extended or adjusted under 35 U.S.C. 154(b) by 559 days.

(21) Appl. No.: 13/742,564

(22) Filed: Jan. 16, 2013

(65) Prior Publication Data

US 2014/0197028 A1 Jul. 17, 2014

(51) Int. Cl.
*G01N 27/447* (2006.01)
*B01L 3/00* (2006.01)

(52) U.S. Cl.
CPC .. *B01L 3/502792* (2013.01); *B01L 2300/0645* (2013.01); *B01L 2400/043* (2013.01); *B01L 2400/0427* (2013.01)

(58) Field of Classification Search
CPC .............. G01N 13/00; G01N 2013/00; B01L 2400/0427; B01L 3/502784-3/502792
See application file for complete search history.

(56) References Cited

U.S. PATENT DOCUMENTS

2006/0097155 A1* 5/2006 Adachi ............. B01L 3/502784 250/288
2007/0241068 A1* 10/2007 Pamula et al. ................ 210/806
2010/0273142 A1 10/2010 Prins et al.
2010/0307922 A1* 12/2010 Wu .............................. 204/643
2011/0104816 A1* 5/2011 Pollack et al. ................ 436/174
2011/0203930 A1* 8/2011 Pamula et al. ................ 204/557
2011/0290647 A1* 12/2011 Feiglin .......................... 204/450
2012/0034684 A1 2/2012 Campbell et al.
2013/0146459 A1* 6/2013 Bazant et al. ................ 204/454

FOREIGN PATENT DOCUMENTS

GB 2016687 9/1979
JP 2011-508203 3/2011

OTHER PUBLICATIONS

R.B. Fair; "Digital microfluidics: is a true lab-on-a-chip possible?"; Microfluid Nanofluid; 2007.

(Continued)

*Primary Examiner* — Gurpreet Kaur
(74) *Attorney, Agent, or Firm* — Renner, Otto, Boisselle & Sklar, LLP

(57) ABSTRACT

A method of droplet manipulation utilizing a droplet manipulation device includes activating elements of the device to bring a first droplet into proximity of a second droplet, controlling the elements of the device to alter the shape of at least one of the first and second droplets, and further controlling the elements of the device to move at least one of the first or second droplets until the droplets are in contact about an aggregate area. The elements are controlled in a manner so as to control the area of contact and the degree of mixing of the fluid between the first and second droplets. The method may be employed to move particles of a particulate suspension from the first droplet to the second droplet. The droplet manipulation device may be an electrowetting on dielectric (EWOD) device, which includes shaping electrodes activated to shape droplets, and a bridging electrode activated to join the droplets to transfer fluid between the shaped droplets.

20 Claims, 12 Drawing Sheets

(56) References Cited

OTHER PUBLICATIONS

Beebe et al.; "One step purification of nucleic acid for gene expression and analysis via Immiscible Filtration Assisted by Surface Tension"; Lab Chip 2011; 2011.

Japanese Office Action for corresponding Japanese patent application No. 2013-262974, dated Jul. 21, 2015.

* cited by examiner

Figure 1 – Prior art

*Figure 2 – Prior art*

Magnet
a
b
c
d
e
f
g
h
2
14
16
30
32
34
36
40

EFFICIENT DILUTION METHOD, INCLUDING WASHING METHOD FOR IMMUNOASSAY

TECHNICAL FIELD

The present invention relates to medical molecular diagnostics, and particularly relates to biochemical assays, for example antibody-based clinical assays (immunoassays). It also is particularly applicable to discrete droplet systems, for example, electrowetting on dielectric (EWOD) arrays.

BACKGROUND ART

The immunoassay is a well established technique for detecting targets in a biological sample (e.g. blood or urine) by employing an antibody specific to that target. Example targets may include cardiac markers such as troponin used to indicate the occurrence of a heart attack, or C-Reactive protein which is an indicator of infection. A common format is the "enzyme-linked immunosorbent assay" or "sandwich ELISA" assay, which requires such antibodies to be bound to a surface such as, for example, the wall of the reaction device or vessel. The use of polymer-coated beads as such a surface is known (e.g. Decker, GB2016687, published Sep. 26, 1979).

FIG. 1 illustrates the process of a typical immunoassay. FIG. 1 in particular illustrates a sequence of combination of droplets of sample and reagent to carry out such an assay. FIG. 1*a* shows a first of droplets 2 containing beads 4 with primary antibody 6 bound to it. The second of droplets 2 contains the target 8. When the first and second droplets are mixed, the target binds to the bead-antibody complex 10. In a next step (FIG. 1 *b*) a further third droplet 2 is introduced containing a secondary antibody 12 conjugated to a fluorescent component. This then binds to those targets that were already bound to the first antibody forming a complex of bead, primary antibody, target and secondary antibody 14. FIG. 1*c* illustrates the key step in the assay, known as washing. The purpose of washing is to remove the unbound secondary antibody 12, which would give a false positive signal, leaving only the bound antibody complex 14. As such, this step is critical in ensuring the accuracy of the assay. The droplet is mixed with a wash buffer 16. The beads are then separated from the unbound antibody by suitable means, leaving only bound secondary antibodies 14. When light of a suitable wavelength 18 is incident on the secondary antibody, it fluoresces and emits light at a longer wavelength 20 that may be detected (FIG. 1*d*). The intensity of such light is proportional to the concentration of bound secondary antibody, and hence to the concentration of original target.

Microfluidics is a rapidly expanding field concerned with the manipulation and precise control of fluids on a small scale, often dealing with sub-microliter volumes. There is growing interest in its application to chemical or biochemical assay and synthesis, both in research and production, and applied to healthcare diagnostics ("lab-on-a-chip"). In the latter case, the small nature of such devices allows rapid testing at the point of need using much smaller clinical sample volumes than for traditional lab-based testing.

Electrowetting on dielectric (EWOD) is a well-known technique for manipulating discrete droplets of fluid by application of an electric field. It is thus a candidate technology for microfluidics for lab-on-a-chip technology. An introduction to the basic principles of the technology can be found in "Digital microfluidics: is a true lab-on-a-chip possible?", (R. B. Fair, Micofluid Nanofluid (2007) 3:245-281).

A common means of carrying out the separation illustrated in FIG. 1*c* is to employ beads that are paramagnetic or ferromagnetic, for example by having a ferrite core. In this case the beads may be immobilized in the presence of a magnetic field. This may be provided, for example, by an electromagnet or a permanent magnet (e.g. neodymium). The beads move in the direction of the magnetic field gradient and hence magnets shaped to enhance magnetic field density and gradient may be advantageous. Once immobilized the droplet containing the unbound antibody may be moved away from the beads. Conversely, the droplet may be held still whilst the magnet, and hence beads, are moved. This process is illustrated in FIG. 2. In FIG. 2*a* the bound antibody complexes 14 and unbound antibodies 12 are combined with buffer 16 in the presence of magnet 22. They are separated to leave bound antibody only in the original droplet (FIG. 2*b*). The droplet may be controlled by various means, for example by an EWOD system. However, such an approach tends to only result in a low dilution factor of the unbound antibody due to the simple mixing of antibody droplet and buffer, which constitutes inefficient washing. Therefore, the process of FIG. 2 requires many repeats of the washing cycle to achieve sufficient dilution, which increases assay time and reagent usage. A system using magnets and EWOD is disclosed in Pamula, et al., US2007/0241068, published on Oct. 18, 2007. Pamula et al, however, does not describe how to achieve high efficiency washing.

Beebe et al. ("One step purification of nucleic acid for gene expression and analysis via Immiscible Filtration Assisted by Surface Tension", Beebe et al, Lab Chip 2011, 11,1747 (2011)) discloses bead-based washing in a fixed chamber format but do not describe any form of droplet control.

Campbell et al., US20120034684A1, published on Feb. 9, 2012, discloses the use of bead-based immunoassay in a disposable cartridge format, but does not describe details on the washing method.

SUMMARY OF INVENTION

An aspect of the invention is a method of droplet manipulation to provide efficient dilution. In the case of an immunoassay, the method provides a means of efficient bead washing.

Such method may use control of droplet shape to control the area of contact between two droplets, which aids in control of the degree of fluid mixing between the two droplets.

In exemplary embodiments, such method may use control of droplet shape to minimize the point of contact between the two droplets, which aids in minimizing the degree of fluid mixing between the two droplets.

In exemplary embodiments, such droplets may be substantially triangular in lateral cross section so as to provide a narrowed region at one side.

In exemplary embodiments, such droplets may be substantially hexagonal in lateral cross section so as to provide narrowed regions at two sides.

In exemplary embodiments, one or more of the droplets contain a particulate suspension, the method providing a means of transferring such particles from one droplet to another.

In exemplary embodiments, bead control is provided by a magnetic field (e.g. by a permanent magnet).

In exemplary embodiments, bead control is provided by an electric field (e.g. by dielectrophoresis (DEP).

In exemplary embodiments, droplet control is provided by an EWOD system.

In exemplary embodiments, droplet control is provided by Surface Acoustic Waves (SAW) control.

The advantages of the invention include the following:

- A simple method for providing highly efficient washing with high dilution factor, an important parameter in assay accuracy that avoids falsely elevated signals.
- Reduces assay time by requiring fewer wash steps and reduces complexity, which is an important requirement for Point of Care applications.
- Reduces device size and quantity of reagents used.
- Applies to any droplet control mechanism, e.g. EWOD, SAW, microvalves and the like.
- Applies to any bead control mechanism e.g., magnets or DEP and the like.

Accordingly, an aspect of the invention is a method of droplet manipulation utilizing a droplet manipulation device. Embodiments of the method of droplet manipulation include the steps of activating elements of the droplet manipulation device to bring a first droplet into proximity of a second droplet, controlling the elements of the droplet manipulation device to alter the shape of at least one of the first and second droplets, and further controlling the elements of the droplet manipulation device to move at least one of the first or second droplets until the droplets are in contact about an aggregate area in a manner so as to control the area of contact and the degree of mixing of the fluid between the first and second droplets.

Another aspect of the invention is an electrowetting on dielectric (EWOD). Embodiments of the EWOD device include a first shaping electrode that has a shape to shape a first droplet when activated, a second shaping electrode that has a shape to shape a second droplet when activated, and a bridging electrode which when activated joins the first droplet to the second droplet at an aggregate area of contact. The electrodes are controlled in a manner so as to control the area of contact and the degree of mixing of the fluid between the first and second droplets.

Another aspect of the invention is a droplet manipulation device. Embodiments of the droplet manipulation device include a plurality of electrode elements, and control circuitry configured to activate and de-activate the plurality of electrode elements to perform the steps of: activating the plurality of electrode elements to bring a first droplet into proximity of a second droplet, controlling the plurality of electrode elements to alter the shape of at least one of the first and second droplets, and further controlling the plurality of electrode elements to move at least one of the first or second droplets until the droplets are in contact about an aggregate area in a manner so as to control the area of contact and the degree of mixing of the fluid between the first and second droplets.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
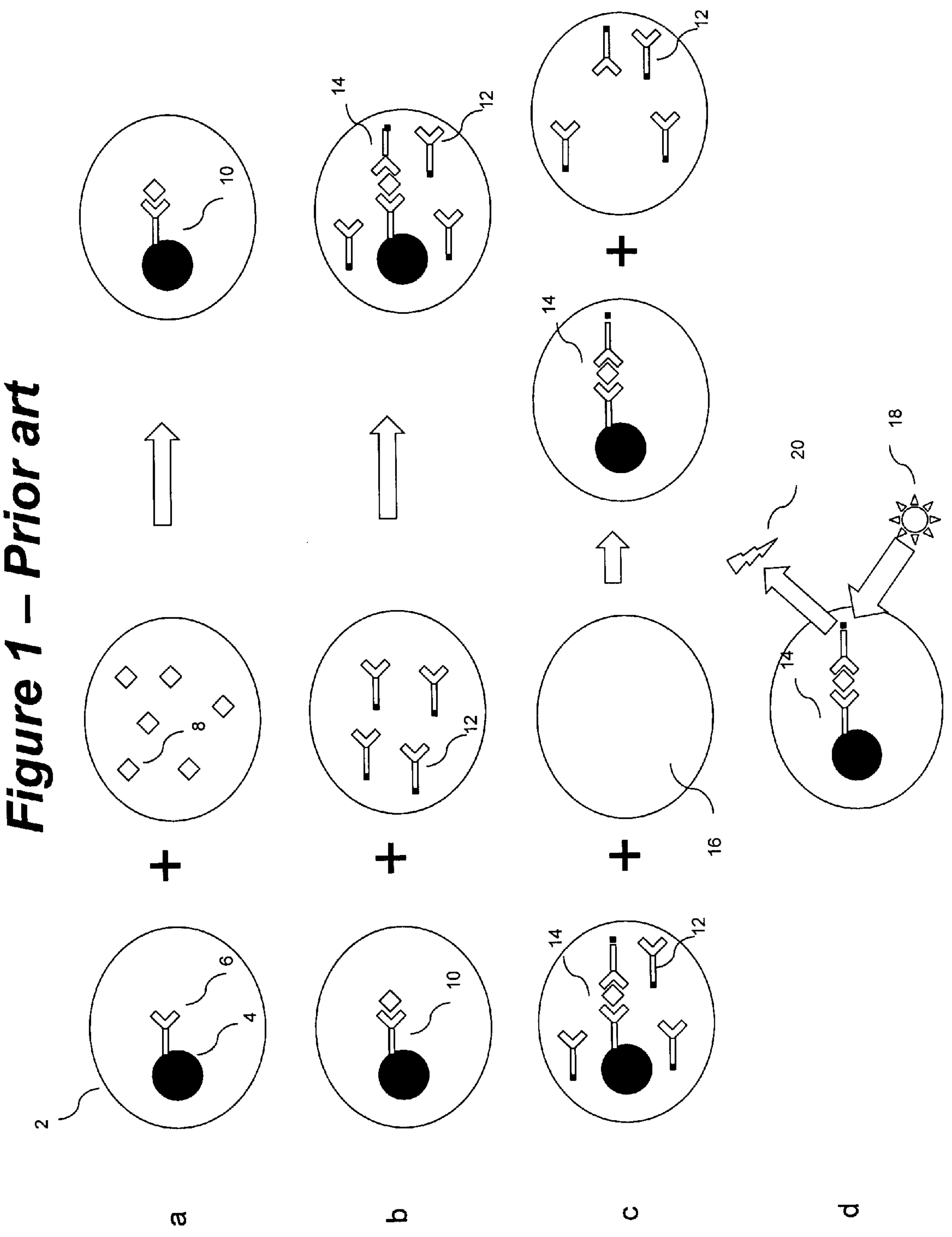
FIG. 1 shows a conventional process of a typical immunoassay.
Figure 2:
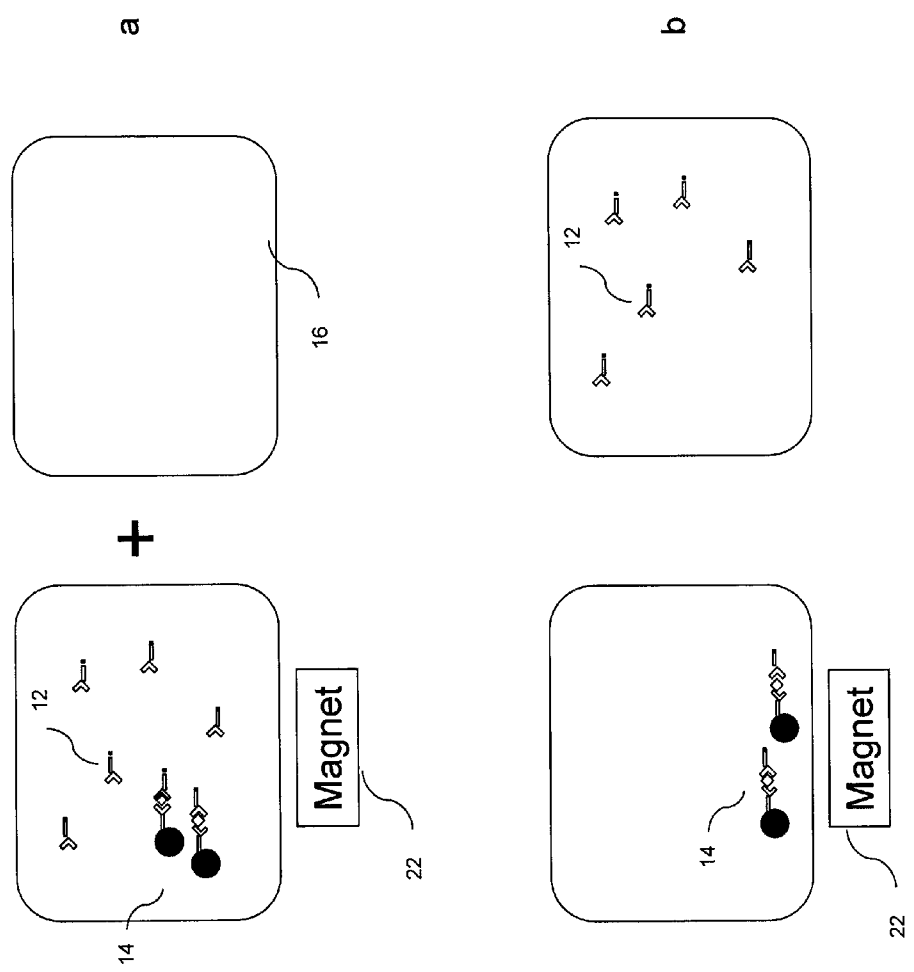
FIG. 2 shows a conventional washing stage of a typical immunoassay.

2 First Droplet
4 Bead
6 First (primary) antibody
8 Target
10 Primary antibody-bead complex
12 Second (secondary) unbound antibody-fluorophore conjugate
14 Primary antibody-bead-secondary antibody complex
16/16*a*/16*b* Second or Buffer droplets
17. Common waste reservoir droplet
18 Incident light
20 Emitted light
22 Magnet
24 Minor hexagonal sides
30 Bottom glass substrate
32 Top glass substrate
34 Spacer
36 Oil
38 Magnet
40 First Aggregate of beads
42 Second Aggregate of Beads
50 Array of electrode elements
52 Activated electrode element
60 First shaping electrode
62 Second shaping electrode

64 Bridging electrode
66 Connecting track
70 First shaping electrode section
72 Second shaping electrode section
74 First bridging electrode section
76 Second bridging electrode section
78 Third shaping electrode section
80 Fourth shaping electrode section
82 Fifth shaping electrode section
84 First mixing electrode
86 Second mixing electrode
128 Electrode layer
132 Spacer
136 Top substrate
138 Electrode element
142 Electrode array
172 Bottom substrate
174 Thin film electronics
176 Row driver circuit
178 Column driver circuit
180 Serial interface
182 Connecting wires
183 Voltage supply interface
184 Array element circuit
186 Column detection circuit
200 Memory element
206 First analogue switch
208 Second analogue switch
210 Switch transistor
216 Sensor circuit

DESCRIPTION OF EMBODIMENTS

Figure 3:
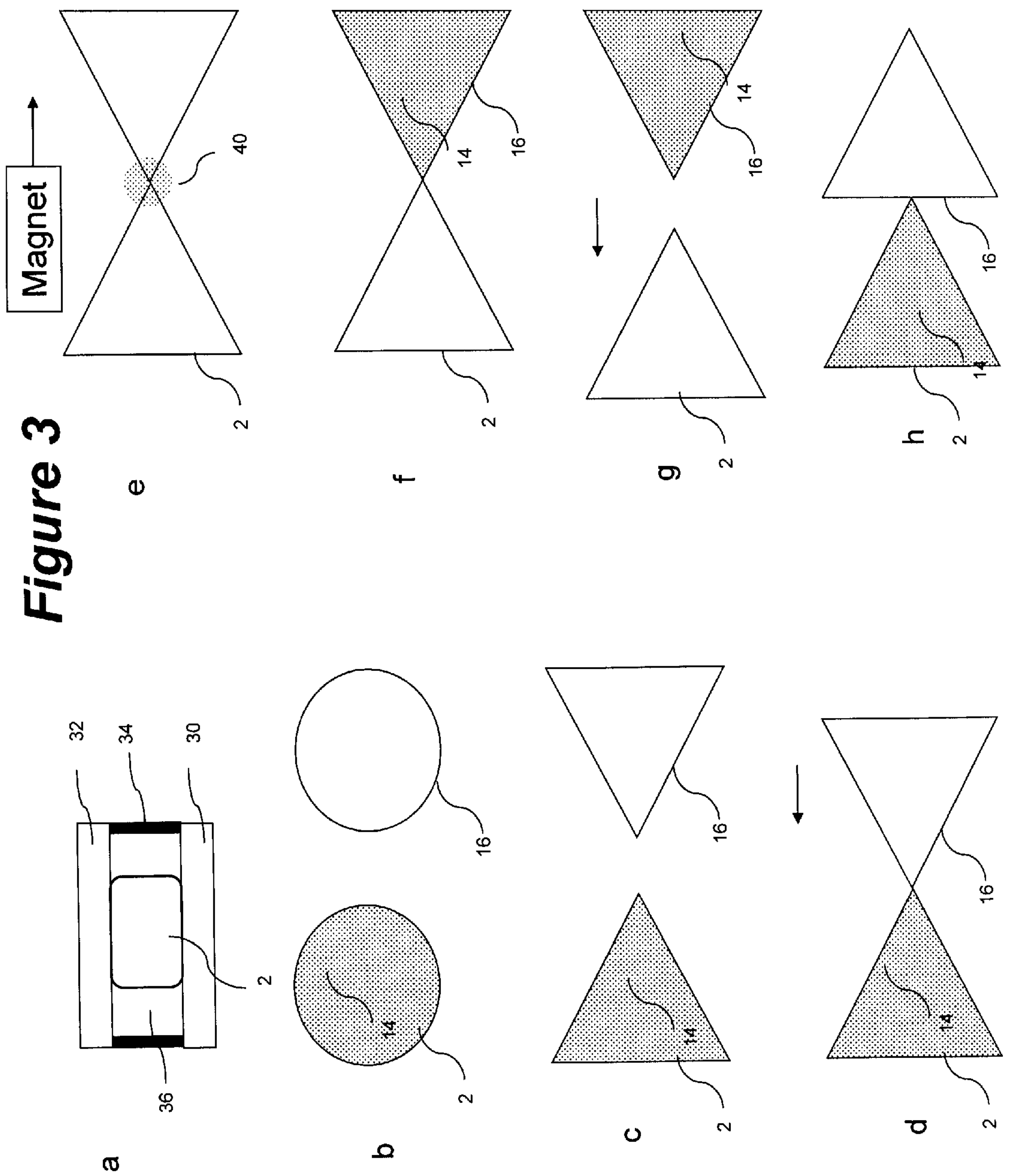
FIG. 3 shows an exemplary washing method in accordance with an embodiment of the present invention.

FIG. 3 shows a first embodiment of the invention, illustrating an implementation of an exemplary washing method on an EWOD device. FIG. 3*a* shows a cross-sectional side view of such an EWOD device in which a droplet 2 is sandwiched between glass substrates 30 and 32 with a spacer 34 in between (the spacer being typically about 120 μm thick). There may be a filler oil 36 (e.g. dodecane) in the space between droplets. Further layers may be present on the inner surface of the glass substrates (not shown in FIG. 1) including for example electrodes (e.g. formed from Indium Tin Oxide), a dielectric layer (e.g. Silicon Nitride) and a hydrophobic layer (e.g. Polytetrafluoroethylene). The EWOD device may function so as to cause the droplets to move or adopt a particular shape.

The remainder of FIG. 3 shows a top view looking down on the device and illustrates the shape and relative position of droplets within the device. FIG. 3*b* shows a state comparable to the beginning of FIG. 1*c*. On the left is a first droplet 2 containing a particulate suspension. In exemplary embodiments, the particulate suspension contains particles that include a bound antibody complex 14 along with free antibody 12 as described above, and on the right is a second droplet 16 containing only wash buffer 16 (e.g. "HEPES": 4-(2-hydroxyethyl)-1-piperazineethanesulfonic acid). Specifically, the shaded elements of the various portions of FIG. 3 are representative of droplet elements containing the particulate suspension including bodies of antibody complex 14.

Generally, the sequential figures of FIG. 3 depict a method of droplet manipulation utilizing a droplet manipulation device, such as an electrowetting on dielectric (EWOD) device. The method includes the steps of: activating elements of the EWOD device to bring a first droplet into proximity of a second droplet; controlling the elements of the EWOD device to alter the shape of at least one of the first and second droplets; and further controlling the elements of the EWOD device to move at least one of the first or second droplets until the droplets are in contact about an aggregate area of contact. The device elements are controlled in a manner so as to control the area of contact and the degree of mixing of the fluid between the first and second droplets, and particularly controlled so as to minimize the area of contact and minimize the degree of mixing of the fluid between the droplets. In exemplary embodiments, the EWOD elements are controlled to alter the shape of at least one of the droplets to have a non-circular cross section. Such altered shape has a first cross sectional area in the vicinity of the aggregate area, and a second cross sectional area not in the vicinity of the aggregate area, and the first dimension is smaller than the second dimension to minimize the aggregate area of contact between the first and second droplets, which aids in minimizing a degree of fluid mixing between the droplets.

FIG. 3*c* shows a state in which the EWOD device is actuated and the droplets are made to adopt a substantially triangular cross section. In FIG. 3*c*, the shapes of both droplets are altered. As referenced above, an important requirement to provide efficient washing is to separate the antibody complex 14 from the free unbound antibody 12. In the process of FIG. 3, particles of the particulate suspension are transferred from the first bead containing droplet 2 to the second droplet 16 whilst minimizing the transfer of fluid containing unbound antibody 12 from the first to the second droplet. In the process of FIG. 3, washing is rendered more efficient by the triangular shaped imposed on the droplets. In particular, the triangular shape provides a minimally sized possible first cross sectional area of a "bridge" between droplets to allow the transfer of particles of the particulate suspension while restricting the volume of fluid transfer. A second cross-sectional area away from the vicinity of the bridge is thus larger than the cross sectional area in the vicinity of the bridge. In the triangular shape the aggregate area of contact 40 is a contact area between apexes of the triangular shapes of the first and second droplets.

As referenced above, it is desirable to minimize the fluid flow from the first droplet 2 to the second droplet 16. A further means to minimize fluid flow from a "dirty" droplet 2 containing antibodies to the "clean" droplet 16 is to ensure the bead-containing droplet does not move during the process, which limits recirculation currents between the two droplets. Therefore, as shown in FIG. 3*d*, the bead containing droplet 2 is held stationary whilst the buffer droplet 16 is moved towards it in the direction indicated by the arrow. A magnet 38 (e.g., a permanent neodymium magnet) is positioned outside the device, for example next to the top glass substrate 32. The magnet is positioned close to the first droplet causing the magnetic bead complexes 14 to be drawn together into a small aggregate 40 as identified in FIG. 3*e*. The magnet may then be moved such that this aggregate of beads may be moved from the first droplet to the second droplet, as depicted by the direction of the arrow associated with the magnet in FIG. 3*e*. FIG. 3*f* illustrates the state in which this transfer has completed—the first droplet should now only contain unbound antibody 12 and the second droplet should now only contain the bound antibody complex 14 with as little unbound antibody as possible. FIG. 3*g* illustrates the final stage where the droplets are separated. Again the droplet containing the beads is held still (which is now the second droplet) and the "dirty" droplet (which is now the first droplet) is moved away out of contact with the first droplet in the direction indicated by the arrow.

The above process may be repeated as often as is needed to achieve the required dilution of unbound antibody 12. This will depend on the concentration of target to be detected and the required sensitivity of the assay. A typical total dilution factor may be $10^6$. For example, if a dilution factor of 100 is achievable in one operation of this sequence, then three operations of this sequence may achieve a total dilution factor of $10^6$. In some implementations, it may useful to allow all the droplets to adopt the same shape, for example, to simplify operation or to provide different means of mixing control. Such an example is shown in FIG. 3*h*, which would be an alternative to the configuration achieved by the process step of FIG. 3*d* (all other process steps modified accordingly to accommodate the different configuration).

Figure 4:
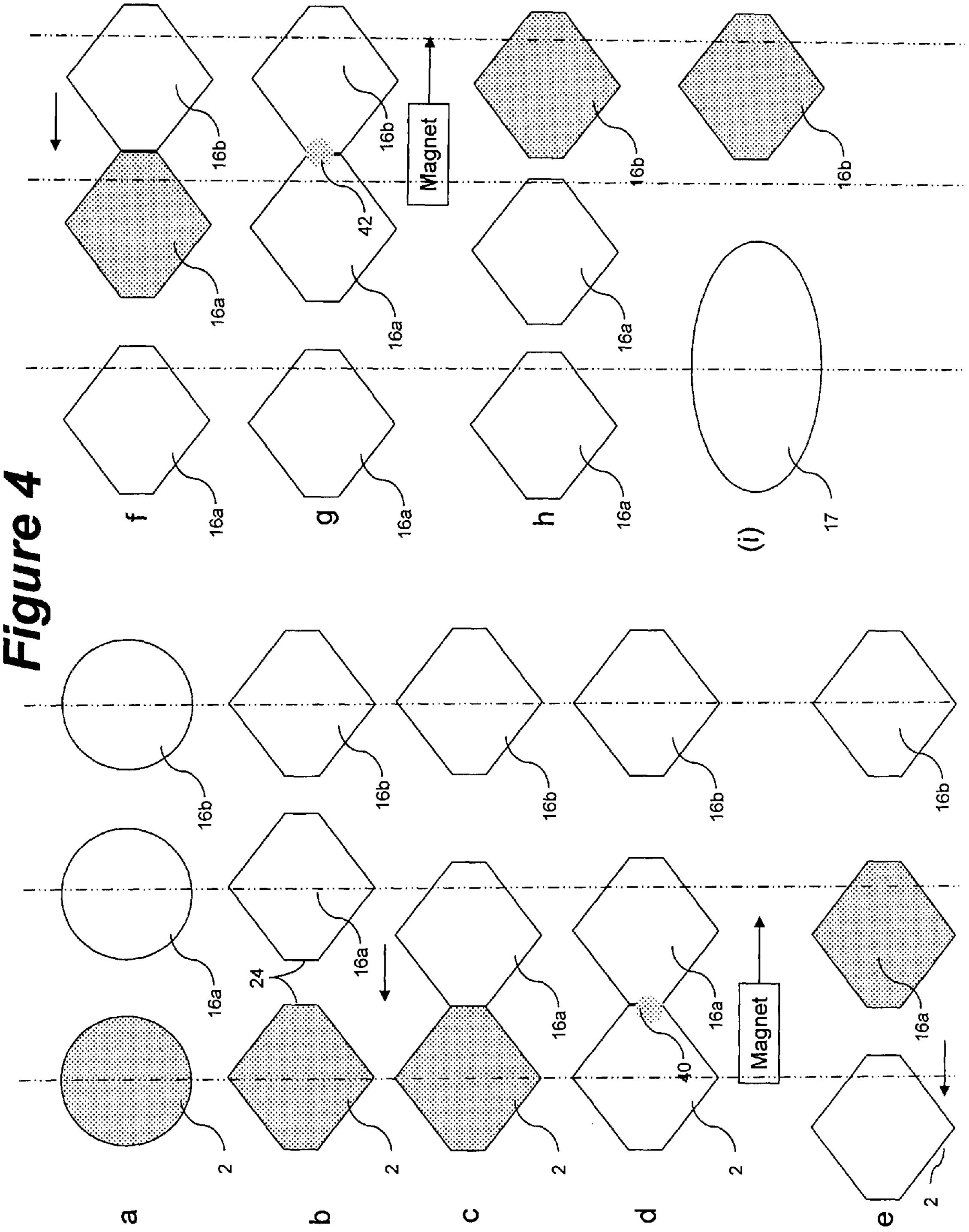
FIG. 4 shows a second exemplary washing method in accordance with an embodiment of the present invention.

FIG. 4 shows a second exemplary washing method. Similarly to FIG. 3, FIG. 4 shows a top down view of droplets as they are subjected to the second exemplary washing method. FIG. 4 illustrates an alternative droplet shape, substantially hexagonal, which may be advantageous where multiple washing sequences are needed and the beads complexes 14 must be moved between a series of droplets. In this example, two washing sequences are shown. FIG. 4*a* shows the starting position of a first droplet 2 containing unbound and bound antibodies on the left, and second and third droplets that are wash buffer droplets 16*a* and 16*b* in the middle and right. FIGS. 4*a-e* illustrate steps analogous to FIG. 3.

Note again, the droplet containing beads 2 remain stationary to minimize flow of fluid between droplets. FIG. 4*b* shows a state in which the EWOD device (see FIG. 4*a*) is actuated and the droplets are made to adopt a substantially hexagonal cross section. As in the previous embodiment, beads with antibody complex 14 are transferred from the first bead containing droplet 2 to the second droplet, buffer droplet 16*a*, while minimizing the transfer of fluid containing unbound antibody 12 from the first to the second droplet. In the process of FIG. 4, washing is rendered more efficient by the hexagonal shape imposed on the droplets. In particular, the hexagonal shape provides a minimally sized possible "bridge" between droplets about the minor hexagonal sides 24 to allow the transfer of beads while restricting the volume of fluid transfer. Accordingly, the aggregate area of contact is a contact area between minor sides of the hexagonal shapes of the first and second droplets.

Similarly to the previous embodiment, a further means to minimize fluid flow from a "dirty" droplet 2 containing antibodies to the "clean" droplet 16*a* is to ensure the bead-containing droplet does not move during the process, which limits recirculation currents between the two droplets. The movements of the droplets are indicated by the shape shift relative to the vertical lines of FIG. 4. Therefore, as shown in FIG. 4*c*, the bead containing droplet 2 is held still whilst the buffer droplet 16*a* is moved towards it in the direction indicated by the arrow. The magnet 38 is again positioned outside the EWOD device causing the magnetic bead complexes 14 to be drawn together into a small first aggregate 40 as identified in FIG. 4*d*. The magnet may then be moved such that this aggregate of beads may be moved from the first droplet to the second droplet, as depicted by the direction of the arrow associated with the magnet in FIG. 4*d*. FIG. 4*e* illustrates the state in which this transfer has completed and the first and second droplets are separated—the first droplet should now only contain unbound antibody 12 and the second droplet should now only contain the bound antibody complex 14 with as little unbound antibody as possible. Again the droplet containing the beads is held still (which is now the second droplet) and the "dirty" droplet (which is now the first droplet) is moved away in the direction indicated by the arrow.

FIGS. 4*f-h* then illustrate a second washing sequence following on from the washing sequence described above as to FIGS. 4*b-e*. Specifically, as shown in FIG. 4*f*, the now bead containing second droplet 16*a* is held still while the third droplet, buffer droplet 16*b*, is moved towards it in the direction indicated by the arrow. The magnet 38 is again positioned outside the EWOD device causing the magnetic bead complexes 14 to be drawn together into a second small aggregate 42 as identified in FIG. 4*g*. The magnet may then be moved such that this aggregate of beads may be moved from the second droplet to the third droplet, as depicted by the direction of the arrow associated with the magnet in FIG. 4*g*. FIG. 4*h* illustrates the state in which this transfer has completed and the second and second droplets are separated—the second first droplet should now only contain unbound antibody 12 and the third droplet should now only contain the bound antibody complex 14 with as little unbound antibody as possible. Again the droplet containing the beads is held still (which is now the second droplet) and the "dirty" droplet (which is now the first droplet) is moved away in the direction indicated by the arrow.

This sequence may be extended to include more repeats of the washing process as is needed to achieve the required dilution of unbound antibody 12. FIG. 4*i* illustrates an optional step where the "dirty" droplets 2 and 16*a* that are no longer required for the assay are combined to a common "waste" reservoir droplet 17. This could either be moved to an unused section of the device, moved to some other store or ejected entirely from the device to free up operating space within the device.

It should be understood that the invention is not limited to the cross-sectional shapes of droplet described above. It includes any droplet shape designed to minimize the point of contact between the two droplets and minimize the degree of mixing of fluid between the two droplets. Any shape is suitable in which the droplet shape has a first cross sectional area in the vicinity of the aggregate area, and a second cross sectional area not in the vicinity of the aggregate area, and the first dimension is smaller than the second direction to minimize the aggregate area of contact between droplets. Such shape characteristics aid in minimizing a degree of fluid mixing between the droplets.

Figure 5:
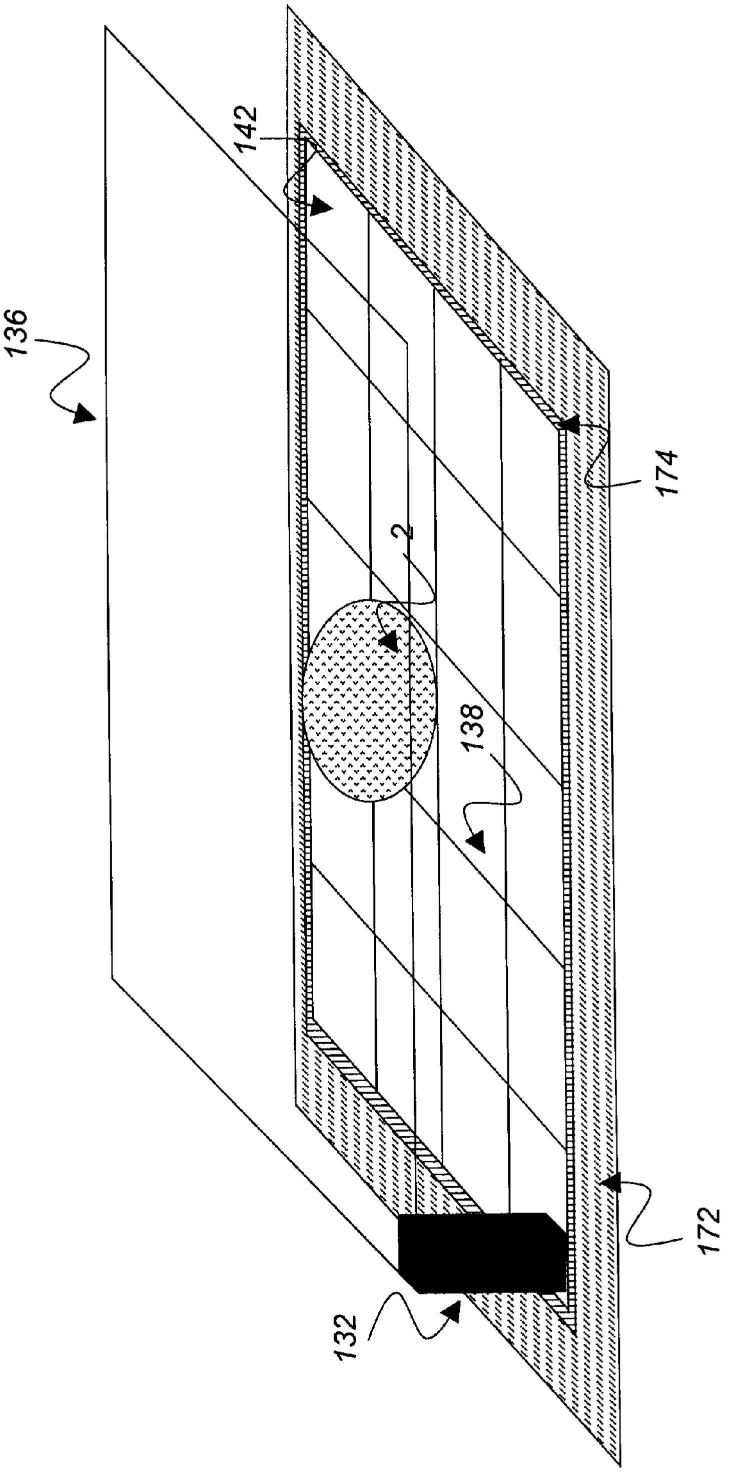
FIG. 5 shows an exemplary AM-EWOD device in schematic perspective.

In one form of known EWOD device called "Active Matrix EWOD" or "AM-EWOD" (e.g. Hadwen et al., U.S. Pat. No. 8,173,000, issued May 8, 2012) a 2D array of electrodes is provided which allows arbitrary control of activation of any of the elements in said array. FIG. 5 shows an example of an AM-EWOD device, which has a lower substrate 172 with thin film electronics 174 disposed upon the substrate 172. The thin film electronics 174 are arranged to drive array element electrodes, e.g. 138. A plurality of array element electrodes 138 are arranged in an electrode array 142, having M×N elements where M and N may be any number. A liquid droplet 2 of a polar liquid is enclosed between the substrate 172 and the top substrate 136, although it will be appreciated that multiple liquid droplets 2 can be present.

Figure 6:
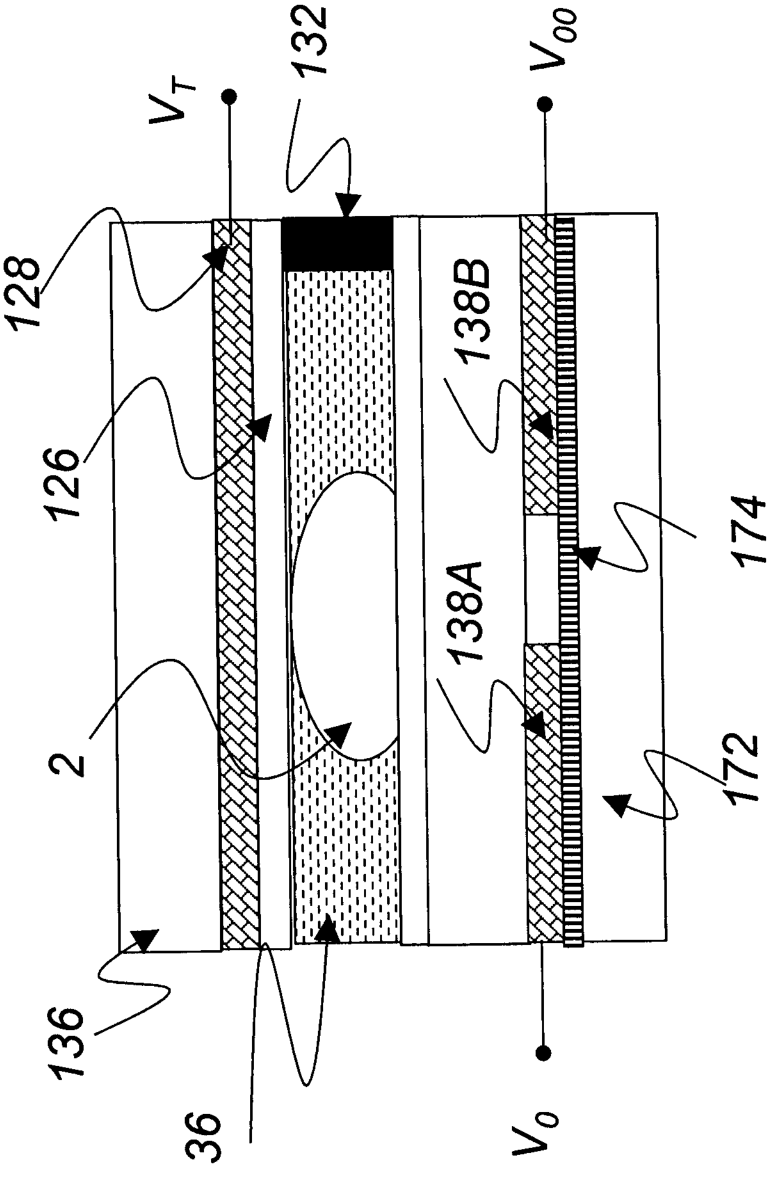
FIG. 6 shows a cross section through some of the array elements of the AM-EWOD device of FIG. 5.

FIG. 6 shows a pair of exemplary array elements in cross section, as may be used in the AM-EWOD device of FIG. 5. The uppermost layer of the lower substrate 172 (which may be considered a part of the thin film electronics layer 174) is patterned so that a plurality of electrodes 138 (e.g., 138A and 138B in FIG. 6) are realized. These may be termed the EW drive elements. The term EW drive element may be taken in what follows to refer both to the electrode 138 associated with a particular array element, and also to the node of an electrical circuit directly connected to this electrode 138.

Figure 7:
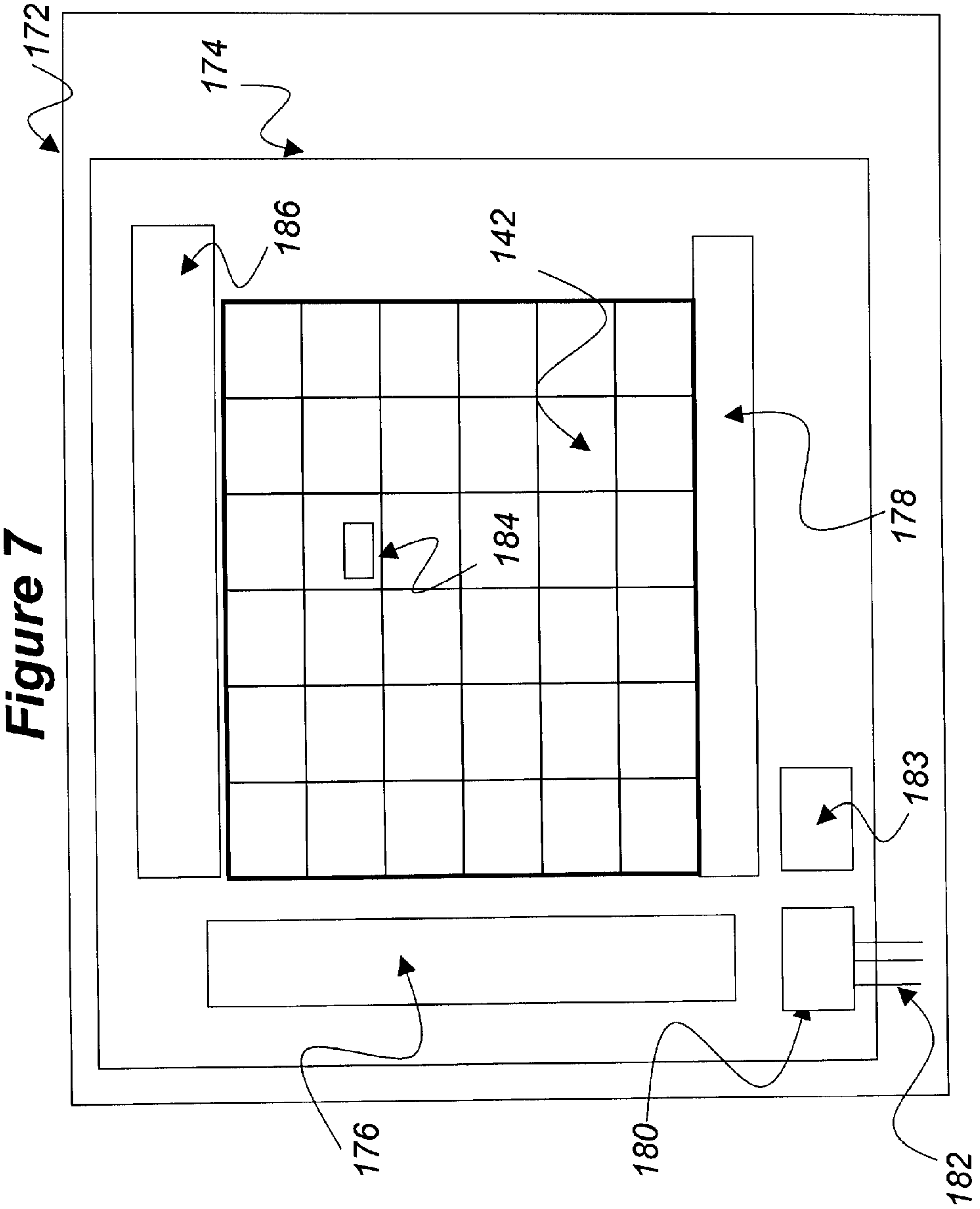
FIG. 7 shows an exemplary arrangement of thin film electronics in the AM-EWOD device of FIG. 5.

An exemplary arrangement of thin film electronics 174 upon the substrate 172 is shown in FIG. 7. Each element of the electrode array 142 contains an array element circuit 184 for controlling the electrode potential of a corresponding electrode 138. Integrated row driver 176 and column driver 178 circuits are also implemented in thin film electronics 174 to supply control signals to the array element circuits 184.

A serial interface 180 may also be provided to process a serial input data stream and write the required voltages to the electrode array 142. A voltage supply interface 183 provides the corresponding supply voltages, top substrate drive voltages, etc., as described herein. The number of connecting wires 182 between the array substrate 172 and external drive electronics, power supplies etc. can be made relatively few, even for large array sizes.

The array element circuit 184 may also optionally contain a sensor function which may, for example, include a means for detecting the presence and size of liquid droplets 2 at each array element location in the electrode array 142. The thin film electronics 174 may also therefore include a column detection circuit 186 for reading out sensor data from each array element and organizing such data into one or more serial output signals which may be fed through the serial interface 180 and output from the device by means of one or more of the connecting wires 182.

Figure 8:
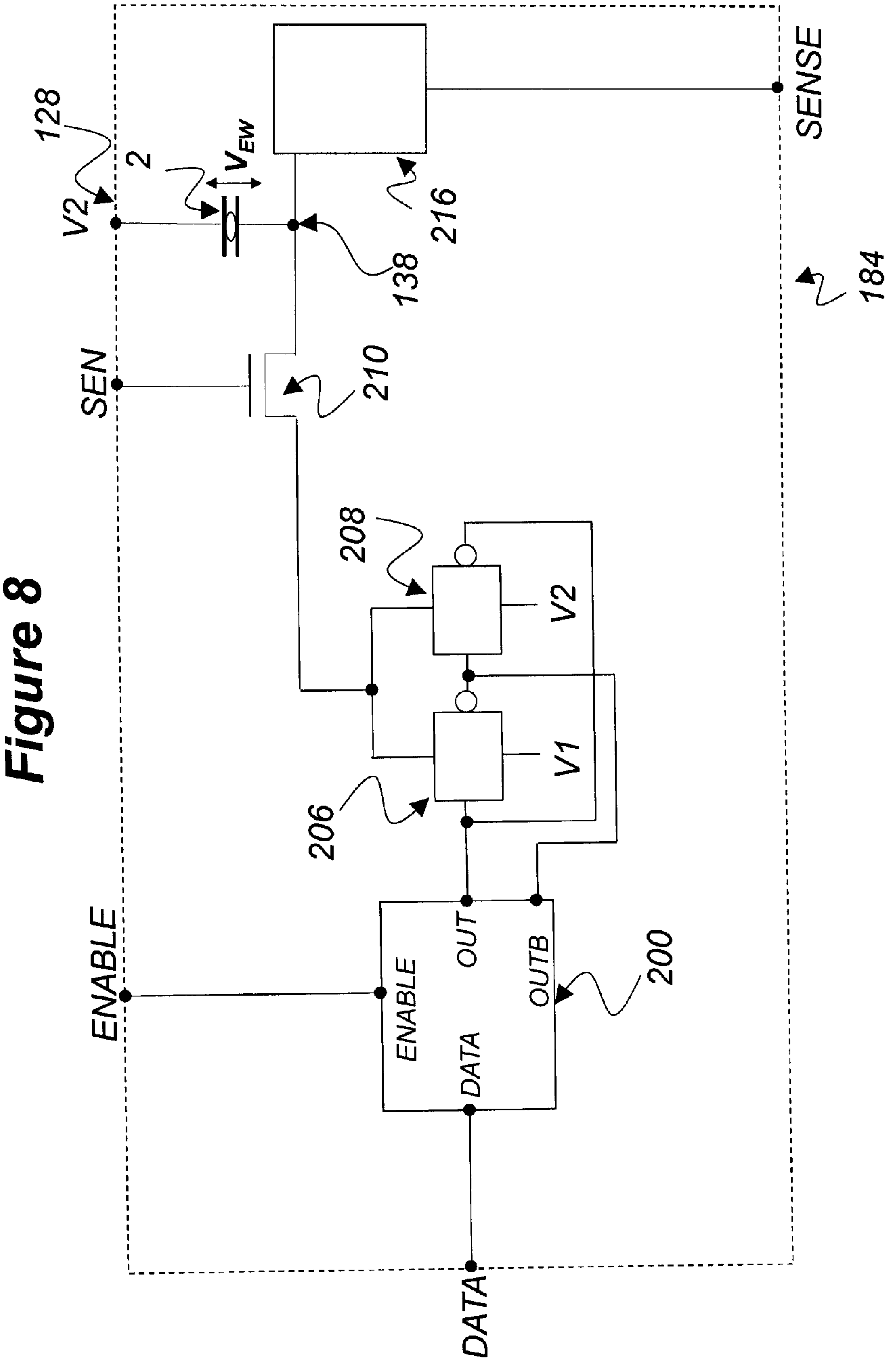
FIG. 8 shows an exemplary array element circuit for used in the AM-EWOD device of FIG. 5.

Components of an exemplary array element circuit 184 are shown in FIG. 8. The remainder of the AM-EWOD device is of the standard construction previously described and includes a top substrate 136 having an electrode 128.

In the example of FIG. 8, each exemplary array element circuit 184 contains:

A memory element 200.

A first analogue switch 206.

A second analogue switch 208.

A switch transistor 210.

The array element may also optionally contain

A sensor circuit 216.

The array element circuit 184 is connected as follows:

The input DATA, which may be common to all elements in the same column of the array, is connected to the DATA input of the memory element 200. The input ENABLE, which may be common to all elements in the same row of the array, is connected to the input ENABLE of the memory element 200. The output OUT of the memory element 200 is connected to the gate of the n-type transistor of first analogue switch 206 and to the gate of the p-type transistor of second analogue switch 208. The output OUTB of the memory element 200 is connected to the gate of the p-type transistor of first analogue switch 206 and to the gate of the n-type transistor of second analogue switch 208. A supply voltage waveform V1 is connected to the input of first analogue switch 206 and a supply voltage waveform V2 is connected to the input of second analogue switch 208, where both V1 and V2 may be common to all elements within the array. The output of first analogue switch 206 is connected to the output of second analogue switch 208, which is connected to the source of switch transistor 210. The input SEN, which may be connected to all elements in the same row of the array is connected to the gate of switch transistor 210. The drain of switch transistor 210 is connected to the electrode 138. The sensor circuit 216, having an output SENSE may also be connected to the electrode 138.

The memory element 200 may be an electronic circuit of standard means capable of storing a data voltage, for example a Dynamic Random Access Memory (DRAM) cell or a Static Random Access Memory (SRAM) cell as are known in the art.

The electrical load presented between the electrode 138 and top substrate 128 is a function of whether or not a liquid droplet 2 is present at the location of the array element and may be approximately represented as a capacitor as shown in FIG. 8. The driving signal V2 is also connected to the top substrate electrode 128 which may be common to all elements within the array. The actuation voltage at a given array element may be defined as the potential difference between the electrode 138 and the top substrate electrode 128.

The sensor circuit 216 may be an electronic circuit of standard means capable of detecting the presence or a property associated with a liquid droplet 2 being present at the location of the array element. Example constructions of sensor circuits are described in Hadwen et al., US application 2012/0007608, published on Jan. 12, 2012.

Figure 9:
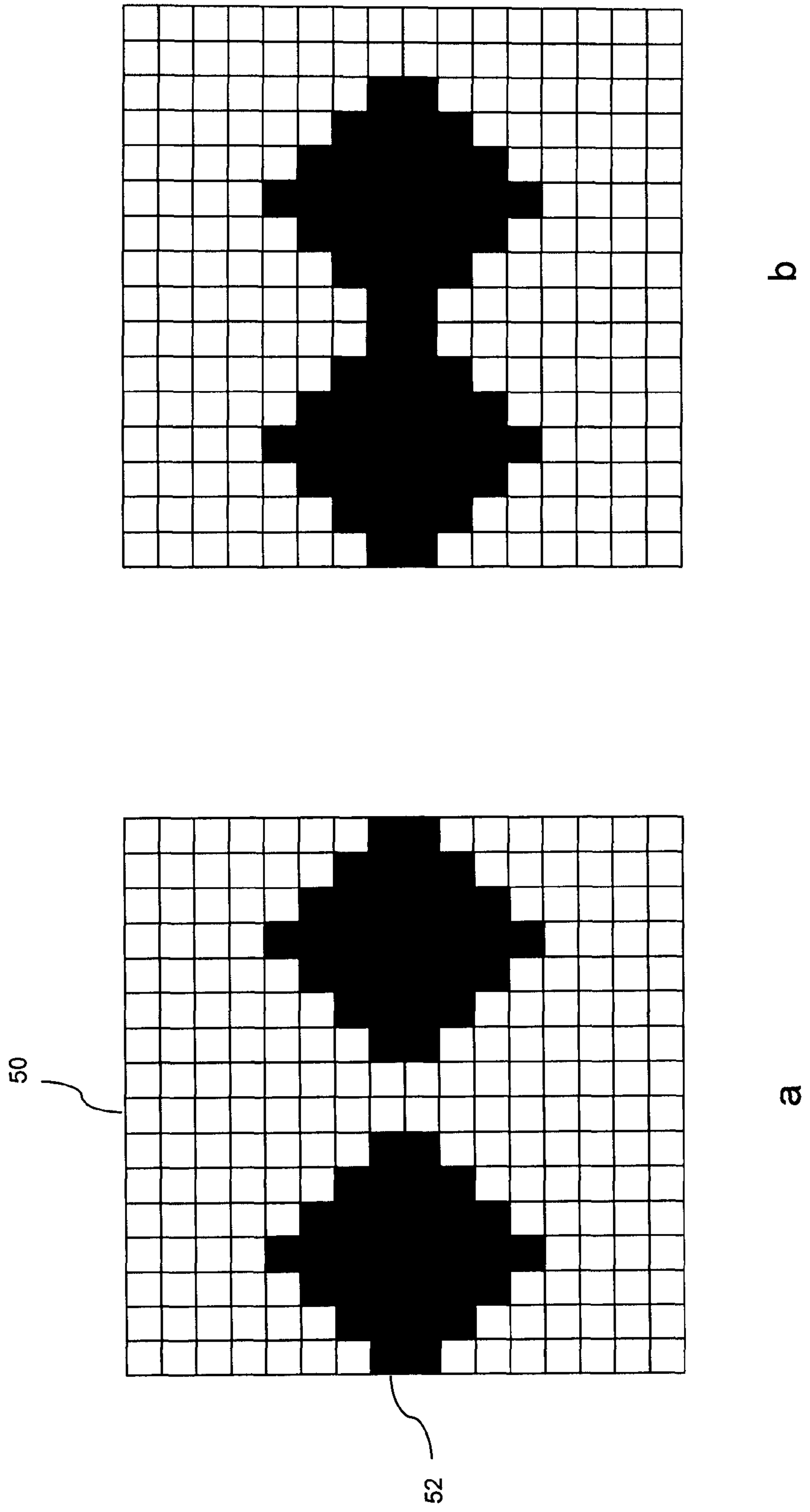
FIG. 9 shows a third exemplary embodiment of the present invention illustrating a configuration of activating elements on an AM-EWOD device to implement a washing method.

FIG. 9 shows a third embodiment of the invention illustrating a means by which the droplet shapes previously described may be achieved using such an AM-EWOD system. FIG. 9*a* shows a grid illustrating part of such an array 50 of an AM-EWOD system. Elements that are colored black 52 represent those EWOD elements that are activated on the array, and the others remain non-activated. These two regions correspond to two of the substantially hexagonal droplets illustrated in the example FIG. 4*b* for example (third droplet not shown). The droplet shape is referred to as substantially hexagonal because a fluid droplet present in this region will adopt a broadly hexagonal shape as shown in FIG. 4. Due to surface tension of the droplet, however, it will not adopt exactly the same shape as the electrodes, i.e., the perimeter will not follow the exact "step-shaped" pattern but rather average to a smooth line more akin to the illustrative hexagons of FIG. 4. A second activation pattern is shown in FIG. 9*b*. When the pattern is changed from FIG. 9*a* to FIG. 9*b*, the right hand droplet will be caused to move into contact with the left hand droplet corresponding to FIG. 4*c*. It may be seen that such a sequence of changing activation patterns may be extended to realize all of the FIG. 4 sequence or longer. By comparable operations of the sequence of changing the activation patterns, it will be appreciated that various suitable droplet shapes, configurations, and movements may be achieved.

Figure 10:
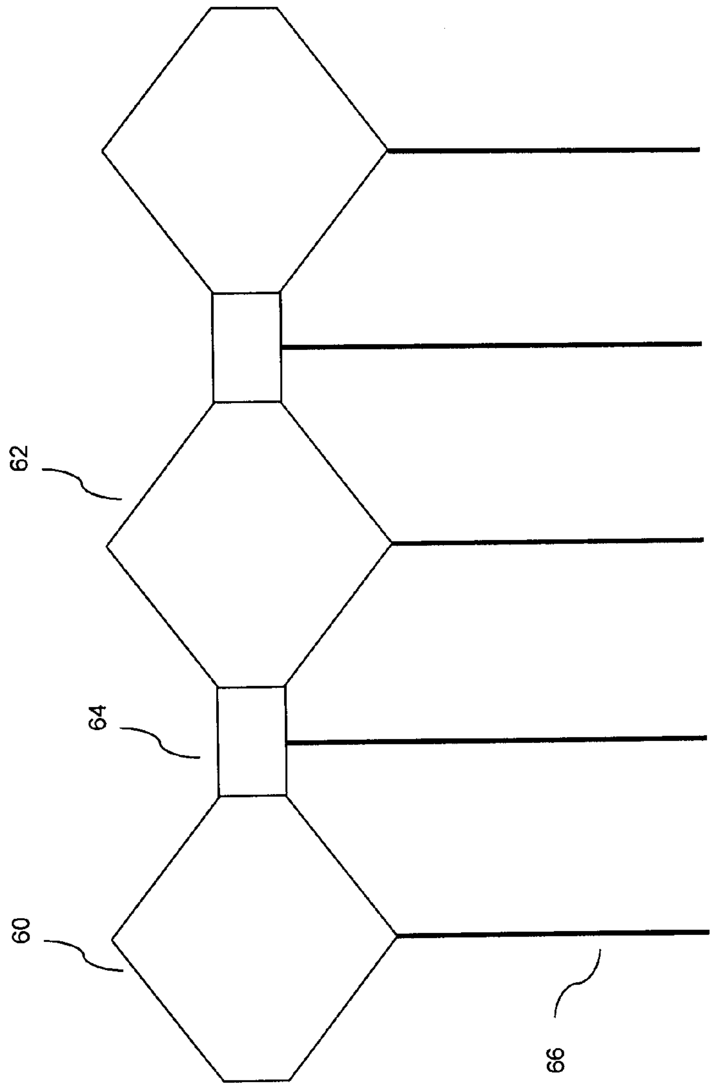
FIG. 10 shows a fourth exemplary embodiment of the present invention illustrating another configuration of activating elements on an EWOD device to implement a washing method.

FIG. 10 illustrates a fourth embodiment of the invention showing an alternative means of achieving droplet shapes. Compared to FIG. 9, FIG. 10 represents a simplified array of electrodes in which a single electrode has a fixed shape which when activated commensurately produces the full shape of the drop required. Due to the reduced number and complexity of electrodes, direct wiring to each electrode is possible and thus appropriate voltages for EWOD activation are applied directly to each electrode. For example, a first shaping electrode 60 may have a fixed shape that commensurately shapes a first droplet when activated corresponding to the left hand droplet 2 of FIG. 4*b*, and track 66 provides connection to an external electrical supply. A second shaping electrode 62 may be provided and may have a fixed shape that commensurately shapes a second droplet when activated corresponding to the middle droplet 16*a* of FIG. 4*b*. Additional electrodes may be provided to shape additional droplets in comparable manner (e.g., the right hand droplet 16*b* of FIG. 4*b*).

In contrast to the method of FIG. 9, the droplets manipulated according to FIG. 10 are not able to simply move towards each other, as the configuration of FIG. 10 does not have the flexibility of a full 2D array. Rather, droplets positioned on two such shaping electrodes 60 and 62 can be made to come together at a narrow joining by activating an additional bridging electrode 64. Beads may be transferred as previously described and the bridging electrode 64 is then de-activated to allow the droplets to separate. FIG. 10 illustrates an example with three shaping electrodes that would manipulate three droplets, but again this may be extended to as many electrodes and corresponding droplets as are needed.

Figure 11:
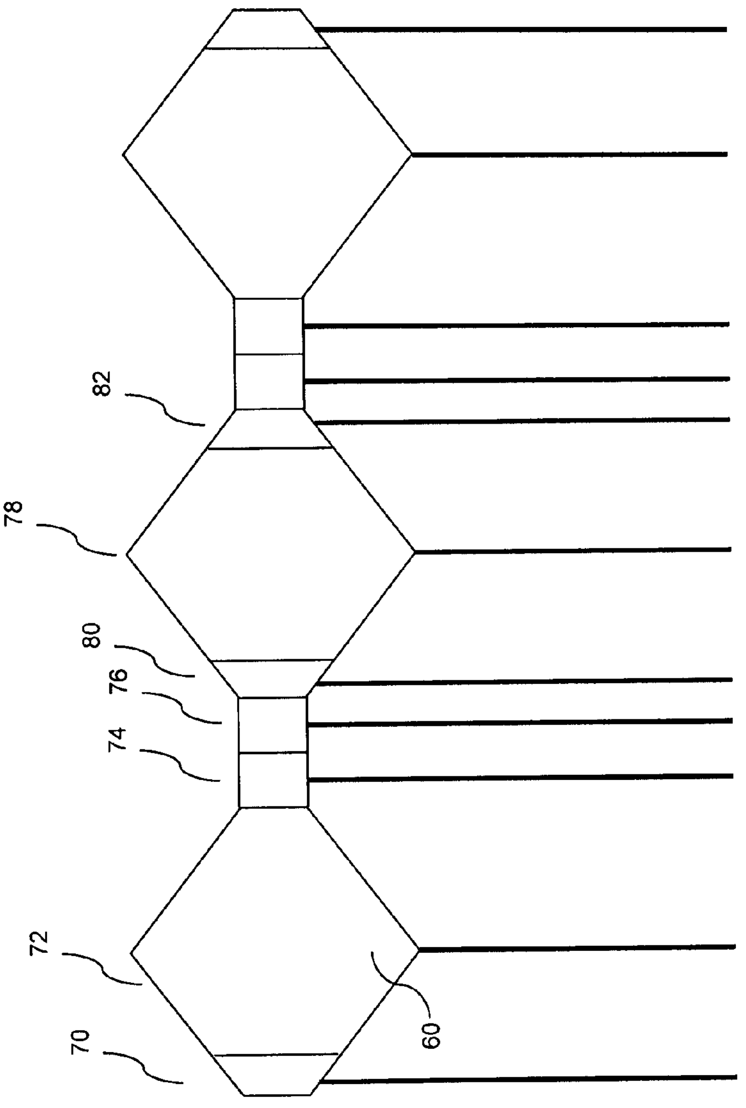
FIG. 11 shows a fifth exemplary embodiment of the present invention illustrating another configuration of activating elements on an EWOD device to implement a washing method.

In some circumstances in EWOD devices, even though an electrode is de-activated surface tension may stop a droplet from fully receding from that region. In the example of FIG. 10, when bridging electrode 64 is deactivated in some cases the link between droplets may not easily break. To address this potential deficiency, FIG. 11 illustrates a fifth embodiment of the invention which differs from FIG. 10 in that some of the electrode shapes are further sub-divided. For example, hexagonal shaping electrode 60 of FIG. 11 is now split into a plurality of shaping electrode sections, such as for example first and second shaping electrode sections 70 and 72, each of which are independently controllable. Bridging electrode 64 is split similarly into a plurality of bridging electrode sections, such as for example first and second bridging electrode sections 74 and 76. Electrode sections 70 and 74 are arranged to occupy the same area, and hence the same droplet volume. They are both somewhat smaller than the main first shaping electrode section 72. The same is true for equivalent pairings within the array. In an initial state corresponding to FIG. 4*b*, for example, shaping electrode sections 70 and 72 are activated together to form a hexagonal droplet as are respectively third, fourth, and fifth shaping electrode sections 78, 80 and 82. In a combining stage, shaping electrode section 70 is de-activated while bridging electrode section 74 is activated, and likewise shaping electrode section 82 is de-activated while bridging electrode section 76 is activated. This causes the bridge to form between droplets. In a final splitting stage this is reversed, i.e. shaping electrode section 70 is activated while bridging electrode section 74 is de-activated, and likewise shaping electrode section 82 is activated while bridging electrode section 76 is de-activated. In particular, the activation of shaping electrode sections 70 and 82 cause the main droplets to pull backwards away from each other and help to break the link between them. In this manner, by sequentially activating and de-activating the various shaping and bridging electrode sections, both droplet shape and movement can be manipulated, and fluid can be moved from the first droplet to the second droplet.

Figure 12:
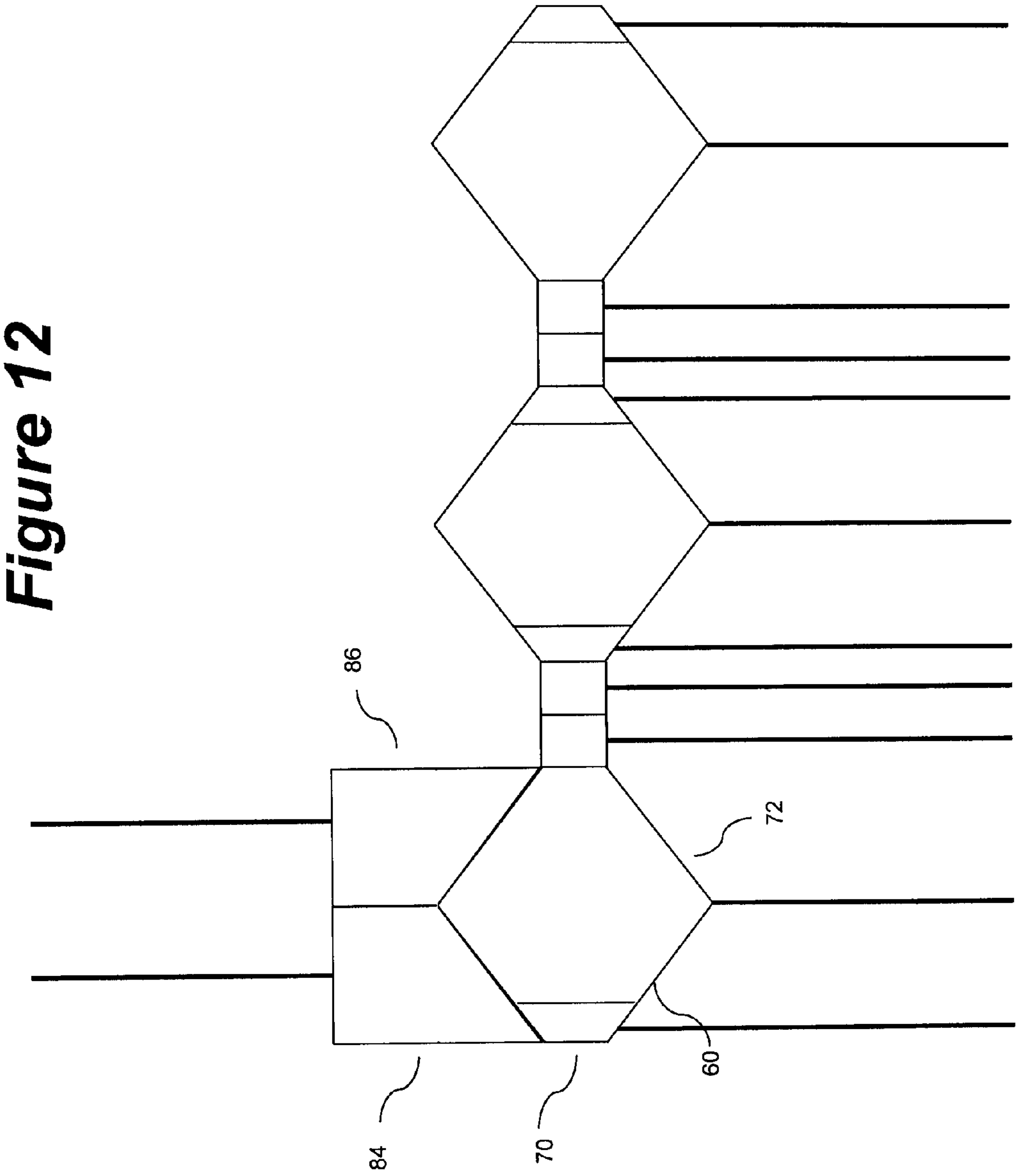
FIG. 12 shows a sixth exemplary embodiment of the present invention illustrating another configuration of activating elements on an EWOD device to implement a washing method.

FIG. 12 illustrates a sixth embodiment of the invention which differs from FIG. 11 in that additional mixing electrodes 84 and 86 of different shapes are present. For example, these mixing electrodes 84 and 86 are designed to fit around shaping electrode sections 70 and 72. By appropriate sequence of activation and deactivation of these four electrode sections, fluid of at least one of the multiple droplets may be moved. For example, a droplet may be made to move back and forth in a linear motion or around in a circular motion (for example by activating the sections in the following sequence: 70 & 72, 84 and then 86). Such motion may be useful to achieve mixing or bead re-dispersal as is required for other steps of the immunoassay (See FIG. 1).

The above embodiments have described use of a magnetic field to manipulate beads carrying the primary antibody. However, the invention is applicable to any suitable means of bead manipulation, for example dielectrophoresis. Dielectrophoresis (DEP) is a phenomenon whereby a force may be exerted on a dielectric particle by subjecting it to a varying electric field. This may be applied to polymer beads for example. It is further possible to provide a device that has an EWOD function for droplet control and a DEP function for bead control, as described in commonly assigned U.S. application Ser. No. 13/232,298. This provides an active matrix array and method of driving whereby the drive signals applied across a liquid droplet can be selected to be either a DC or low frequency AC voltage waveform for actuating the droplet by EWOD, or else a high frequency AC voltage waveform for actuating the droplet by DEP.

The above embodiments have described use of EWOD to control droplet movement. However, the invention is applicable to any suitable means of droplet manipulation. For example, Surface Acoustic Waves (SAW) are another potential technique for enabling droplet microfluidics where a high frequency voltage applied to electrodes on a piezoelectric crystal excites a SAW, which can be utilized to manipulate the liquids.

An example process for carrying out an immunoassay was described above with respect to FIG. 1. However, many variants on this are known and may be advantageous depending on the application. One important example is where the secondary antibody 12 is conjugated not to a fluorophore, but to an enzyme, for example Alkaline Phosphatase. The droplet containing the bead-antibody-enzyme complex 14 is then mixed with a droplet of a further reagent. This reagent is chosen such that when acted upon by the enzyme, its optical characteristics change at a rate in proportion to the enzyme (and hence target) concentration. Such a reagent may be fluorescent in a manner similar to the original process. For example, "BBTP" (2'-[2-benzothiazoyl]-6'-hydroxybenzothiazole phosphate) will emit at a wavelength around 555 nm when excited by light of 440 nm in the presence of alkaline phosphatase. Alternatively, the reagent may provide a colorimetric assay i.e. exhibits a change in optical transmission at some wavelength in response to the enzyme. For example, "BCIP" (5-bromo-4-chloro-3-indolyl phosphate) has a reduced optical transmission around a wavelength 600 nm in the presence of alkaline phosphatase. Yet alternatively, the reagent may provide a chemiluminescent assay, i.e. emits light in the presence of the enzyme. For example, CDP-Star (1,2-dioxetane) substrate (Invitrogen) emits light in the presence of alkaline phosphatase.

It should be understood, therefore, that the invention may apply to any type of assay, not just those utilizing antibodies. Furthermore it may apply to any droplet system containing solid particles other than polymer beads, for example glass beads or biological cells such as blood cells.

The above discussion has covered applications involving some particle transfer, but it should be understood that the invention may apply to any application that requires efficient control of dilution ratio. For example, it may be advantageous to generate a series of increasing accurately-known dilutions from an original sample in order to improve accuracy of analysis (by providing multiple distinct measurements of the same sample). Alternatively, different concentrations of a sample may be useful for performing different forms of analysis, for example an original sample may be used for colorimetric measurement whereas an accurately diluted version may be used for fluorescence measurement (the lower concentration may be needed to avoid saturation or self-quenching).

In accordance with the above, an aspect of the invention is a method of droplet manipulation utilizing a droplet manipulation device. Exemplary embodiments of the method of droplet manipulation include the steps of activating elements of the droplet manipulation device to bring a first droplet into proximity of a second droplet, controlling the elements of the droplet manipulation device to alter the shape of at least one of the first and second droplets, and further controlling the elements of the droplet manipulation device to move at least one of the first or second droplets until the droplets are in contact about an aggregate area in a manner so as to control the area of contact and the degree of mixing of the fluid between the first and second droplets.

In exemplary embodiments of the method of droplet manipulation, the device elements are controlled to alter the shape of at least one of the droplets to have a non-circular cross section.

In exemplary embodiments of the method of droplet manipulation, the altered shape has a first cross sectional area in the vicinity of the aggregate area, and a second cross sectional area not in the vicinity of the aggregate area, and the first dimension is smaller than the second direction to minimize the aggregate area of contact between the first and second droplets.

In exemplary embodiments of the method of droplet manipulation, the device elements are controlled so as to minimize the area of contact and minimize the degree of mixing of fluid between the droplets.

In exemplary embodiments of the method of droplet manipulation, the altered shape of the first and second droplets is triangular, and the aggregate area is a contact area between apexes of the triangular shapes of the first and second droplets.

In exemplary embodiments of the method of droplet manipulation, the altered shape of the first and second droplets is hexagonal, and the aggregate area of contact is a contact area between minor sides of the hexagonal shapes of the first and second droplets.

In exemplary embodiments of the method of droplet manipulation, the first droplet contains a particulate suspension, and particles of the particulate suspension are transferred from the first droplet to the second droplet.

In exemplary embodiments of the method of droplet manipulation, the second droplet is moved to be in contact with the first droplet while the first droplet is held stationary.

In exemplary embodiments of the method of droplet manipulation, the method further includes, after particles of the particulate suspension are transferred from the first droplet to the second droplet, controlling the elements of the droplet manipulation device to move the first droplet out of contact with the second droplet.

In exemplary embodiments of the method of droplet manipulation, the particles of suspension comprise antibody complex particles.

In exemplary embodiments of the method of droplet manipulation, the droplet manipulation device is an electrowetting on dielectric (EWOD) device.

Another aspect of the invention is an electrowetting on dielectric (EWOD). Exemplary embodiments of the EWOD device include a first shaping electrode that has a shape to shape a first droplet when activated, a second shaping electrode that has a shape to shape a second droplet when activated, and a bridging electrode which when activated joins the first droplet to the second droplet at an aggregate area of contact. The electrodes are controlled in a manner so as to control the area of contact and the degree of mixing of the fluid between the first and second droplets.

In exemplary embodiments of the EWOD device, each shaping electrode comprises a plurality of shaping electrode sections that are independently controllable to alter the shape of the first and second droplets.

In exemplary embodiments of the EWOD device, the bridging electrode includes a plurality of bridging electrode sections, wherein the shaping electrode sections and the bridging electrode sections are activated and de-activated in a sequence to move particulates between the first droplet and the second droplet.

In exemplary embodiments of the EWOD device, at least one of the shaping electrode sections of the first shaping electrode, or at least one of the electrode sections of the second shaping electrode, have the same area of at least one of the bridging electrode sections.

In exemplary embodiments of the EWOD device, each of the shaping electrodes has a hexagonal shape.

In exemplary embodiments of the EWOD device, a shape of the first shaping electrode differs from a shape of the second shaping electrode.

In exemplary embodiments of the EWOD device, the EWOD device further includes a plurality of mixing electrodes, wherein the shaping electrodes and mixing electrodes are configured to be activated and de-activated in a sequence to move fluid of at least one of the first droplet or the second droplet.

In exemplary embodiments of the EWOD device, the first droplet contains a particulate suspension, and the EWOD device further includes a magnet that generates a magnetic field to transfer particles of the particulate suspension from the first droplet to the second droplet.

Another aspect of the invention is a droplet manipulation device. Exemplary embodiments of the droplet manipulation device include a plurality of electrode elements, and control circuitry configured to activate and de-activate the plurality of electrode elements to perform the steps of: activating the plurality of electrode elements to bring a first droplet into proximity of a second droplet, controlling the plurality of electrode elements to alter the shape of at least one of the first and second droplets, and further controlling the plurality of electrode elements to move at least one of the first or second droplets until the droplets are in contact about an aggregate area in a manner so as to control the area of contact and the degree of mixing of the fluid between the first and second droplets.

INDUSTRIAL APPLICABILITY

The described methods and devices may be used for a number of droplet microfluidic applications such as Point-of-Care (POC) diagnostics, disease detection, and biological sample synthesis. In particular, the described methods and devices may be useful in combination with various Active Matrix EWOD microfluidics platforms.

What is claimed is:

1. A method of droplet manipulation utilizing a droplet manipulation device comprising individually activatable elements, the method comprising the steps of:

activating elements of the droplet manipulation device to bring a first droplet into proximity of a second droplet;

selectively activating a portion of the elements of the droplet manipulation device to generate a shaping electrode comprising a plurality of activated elements that alters a shape of at least one of the first and second droplets, the shaping electrode having a first cross-sectional area;

further selectively activating another portion of the elements of the droplet manipulation device to form a bridging electrode comprising another plurality of activated elements having an aggregate area between the first and second droplets, the aggregate area having a second cross-sectional area smaller than the first cross-sectional area to control a degree of mixing of fluid between the first and second droplets; and further controlling the elements of the droplet manipulation device to move at least one of the first or second droplets until the droplets are in contact about the aggregate area in a manner so as to control the degree of mixing of fluid between the first and second droplets.

2. The method of droplet manipulation of claim 1, wherein the elements are activated to alter the shape of at least one of the first or second droplets to have a non-circular cross section.

3. The method of droplet manipulation of claim 2, wherein the altered shape has a first dimension in the vicinity of the aggregate area, and a second dimension not in the vicinity of the aggregate area, and the first dimension is smaller than the second dimension to minimize the aggregate area between the first and second droplets.

4. The method of droplet manipulation of claim 3, wherein the elements are activated so as to minimize the aggregate area and minimize the degree of mixing of fluid between the first and second droplets.

5. The method of droplet manipulation of claim 4, wherein the altered shape of the first and second droplets is triangular, and the aggregate area is a contact area between apexes of the triangular shapes of the first and second droplets.

6. The method of droplet manipulation of claim 4, wherein the altered shape of the first and second droplets is hexagonal, and the aggregate area is a contact area between minor sides of the hexagonal shapes of the first and second droplets.

7. The method of droplet manipulation of claim 1, wherein the first droplet contains a particulate suspension, and particles of the particulate suspension are transferred from the first droplet to the second droplet.

8. The method of droplet manipulation of claim 7, wherein the second droplet is moved to be in contact with the first droplet while the first droplet is held stationary.

9. The method of droplet manipulation of claim 8, further comprising, after particles of the particulate suspension are transferred from the first droplet to the second droplet, controlling the elements of the droplet manipulation device to move the first droplet out of contact with the second droplet.

10. The method of droplet manipulation of claim 7, wherein the particles of suspension comprise antibody complex particles.

11. The method of droplet manipulation of claim 1, wherein the droplet manipulation device is an electrowetting on dielectric (EWOD) device.

12. An electrowetting on dielectric (EWOD) device comprising:

a plurality of individually activatable electrode elements; and control circuitry configured to selectively activate portions of the plurality of individually activatable electrode elements to:

form a first shaping electrode comprising a plurality of activated electrode elements that has a shape to shape a first droplet when activated;

form a second shaping electrode comprising another plurality of activated electrode elements that has a shape to shape a second droplet when activated; and form a bridging electrode comprising yet another plurality of activated electrode elements and having an aggregate area, which when activated joins the first droplet to the second droplet at the aggregate area to bring the first and second droplets in contact, wherein the first and second shaping electrodes are controlled in a manner so as to control an area of contact and degree of mixing of fluid between the first and second droplets;

wherein the aggregate area of the bridging electrode has a first cross-sectional area smaller than a second cross-sectional area of the first and second shaping electrodes so that the aggregate area is a reduced area to control the degree of mixing of the fluid between the first and second droplets.

13. The EWOD device of claim 12, wherein each of the first and second shaping electrodes further comprises a plurality of shaping electrode sections that are independently controllable to alter the shape of the first and second droplets.

14. The EWOD device of claim 13, wherein the bridging electrode further comprises a plurality of bridging electrode sections, wherein the shaping electrode sections and the bridging electrode sections are activated and de-activated in a sequence to move particulates between the first droplet and the second droplet.

15. The EWOD device of claim 14, wherein at least one of the plurality of shaping electrode sections of the first shaping electrode, or at least one of the plurality of shaping electrode sections of the second shaping electrode, have the same area of at least one of the plurality of bridging electrode sections.

16. The EWOD device of claim 12, wherein each of the first and second shaping electrodes has a hexagonal shape.

17. The EWOD device of claim 12, wherein a shape of the first shaping electrode differs from a shape of the second shaping electrode.

18. The EWOD device of claim 12, further comprising a plurality of mixing electrodes, wherein the first and second shaping electrodes and mixing electrodes are configured to be activated and de-activated in a sequence to move the fluid of at least one of the first droplet or the second droplet.

19. The EWOD device of claim 12, wherein the first droplet contains a particulate suspension, and further comprising a magnet that generates a magnetic field to transfer particles of the particulate suspension from the first droplet to the second droplet.

20. A droplet manipulation device comprising:

a plurality of individually activatable electrode elements; and control circuitry configured to activate and de-activate the plurality of individually activatable electrode elements to perform the steps of:

activating the plurality of individually activatable electrode elements to bring a first droplet into proximity of a second droplet;

controlling the plurality of individually activatable electrode elements to form a shaping electrode comprising a plurality of activated elements that alters a shape of at least one of the first and second droplets, the shaping electrode having a first cross-sectional area;

further controlling the plurality of the individually electrode elements to form a bridging electrode comprising another plurality of activated elements having an aggregate area between the first and second droplets, the aggregate area having a second cross-sectional area smaller than the first cross-sectional area to control a degree of mixing of fluid between the first and second droplets; and further controlling the plurality of individually activatable electrode elements to move at least one of the first or second droplets until the first and second droplets are in contact about the aggregate area in a manner so as to control the degree of mixing of the fluid between the first and second droplets.

* * * * *